3,382,536
SCREW EXTRUDER

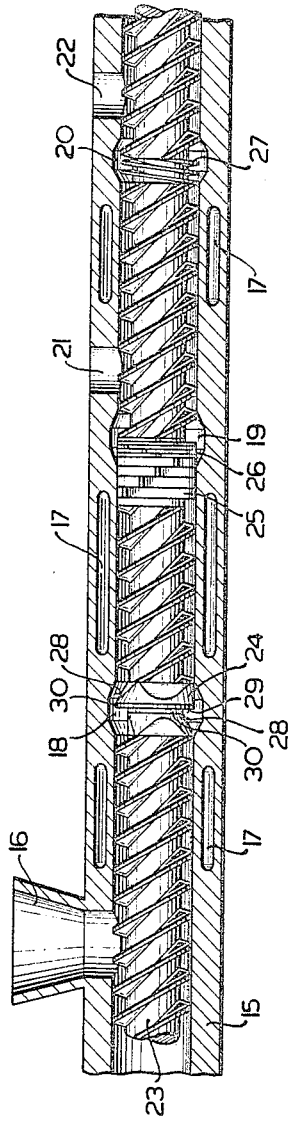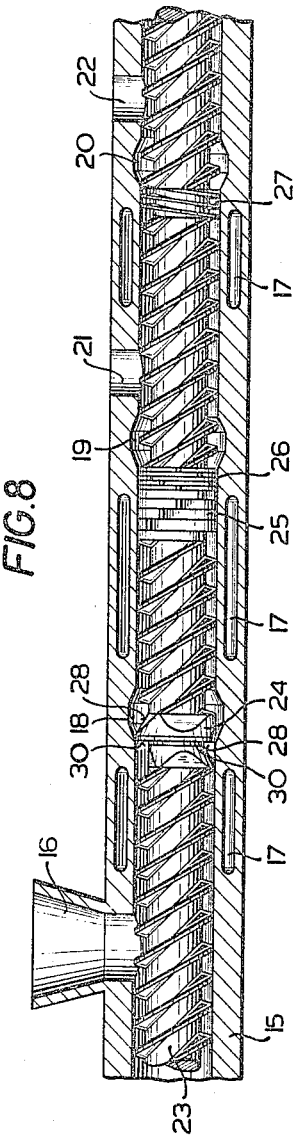

Rudolf P. Fritsch, Stuttgart-Weilimdorf, Erwin Bauer, Grossheppach, and Gerhard H. M. May, Mulheim, Germany, assignors to Werner & Pfleiderer, Stuttgart-Feuerbach, Germany, a firm of Germany
Filed Feb. 11, 1966, Ser. No. 526,734
Claims priority, application Germany, Feb. 13, 1965, W 38,545
13 Claims. (Cl. 18—12)

ABSTRACT OF THE DISCLOSURE

A screw-type extruder for working material with at least two intermeshing screws rotatably mounted in a common drum. Each of the screws includes at least one retarding means with a conveying rate less than the conveying rate of the screw threads and coacting with the peripheral groove in the drum. The screws are lengthwise displaceable in the drum between a position substantially in transverse alignment with the groove and a position displaced in reference thereto, thereby correspondingly varying the retardation factor experienced by the material when and while being forced through the retarding means.

---

The present invention relates to a screw-type extruder, and more particularly to an extruder of this type including several mutually parallel meshing conveyor screws or worms rotatable either in the same direction or in opposition.

Extruders of this kind are widely used.

It is known to include gradually adjustable retarding means in each of the screws to increase concentration or densification of the material to be worked in the extruder. More particularly, it is known to interpose between two sections of a screw a throttling means which is adjustable from the outside of the extruder. In such an arrangement the inner diameter of the throttling means is smaller than the outer diameter of the screw. As a result, cleaning of the extruder requires disassembly of the extruder drum and of the screws themselves and thereafter reassembly and readjustment of the extruder. This is time consuming and entails a substantial loss of useful production time. Furthermore, the arrangement presents serious sealing problems, especially when high temperatures are involved.

For extruders of the kind using conveyor screws which do not mesh and have a uniform external diameter it has been proposed to provide one or several retarding means in the form of a peripheral gap defined by a peripheral flange interposed between the threads of the screws and having an outer diameter substantially equal to or slightly less than the inner diameter of the extruder drum. This flange coacts with a shallow peripheral groove provided in the inner wall of the drum. Such an arrangement has the advantage that the screws can be withdrawn from the drum without disassembly of the screws or the drum, for instance, to be serviced, but it is not applicable to extruders with meshing screws.

It is a broad object of the invention to provide a novel and improved retarding means for an extruder with meshing screws which permits withdrawal of the screws from the extruder for the purpose of servicing or other purposes without requiring disassembly of either the drum or the screws, and which can be used under very diverse operational conditions and is gradually adjustable within a wide range in accordance with the desired densification of the material to be worked.

It is a further object of the invention to provide an extruder including a retarding means which permits the use of a closed or one-piece drum, thereby avoiding the sealing problems which are present with extruders equipped with retarding means as heretofore known, and which can be built with a comparatively short drum, thereby reducing the manufacturing costs and the space requirements. The extruder of the invention also has the advantage that the self-cleaning action of meshing screws is retained for the entire length of the extruder and that the frequently necessary cooling of the extruder can be accomplished in a simple fashion. When several retarding means according to the invention are provided, only selected ones of the retarding means may be operated, depending upon the specific properties of the material to be worked, thereby considerably increasing the versatility of the extruder. The conveying screws of the extruder may be composed of standard screw elements mounted on a common drive shaft, thereby avoiding or at least reducing the need for providing expensive special parts.

The afore-pointed-out objects, features and advantages of the invention are attained by providing an extruder with several meshing rotary conveyor screws each of which includes intermediate its ends a retarding means having retarding elements oppositely directed to the conveying direction of the screw threads adjacent the retarding means, thereby effecting retarding and thus densification of the material while passing the retarding means. The screws are rotatably and lengthwise displaceably supported in a drum which has at one end a feed inlet and at the other end a discharge outlet and includes in its inner wall a peripheral groove intermediate the ends of the drum to define an axially limited enlargement of the inner diameter of the drum, said groove constituting part of the retarding means. The screws are gradually displaceable between a minimal retarding position in which the retarding elements of the retarding means in each screw are in transverse registry with the respective groove and a maximal retarding position in which the retarding elements are displaced in reference to the respective groove. Each of the retarding elements may be formed by threads or rotary kneading disks the conveying directions of which are in opposition to the direction of the extruder screws.

According to another embodiment of the invention, each of the retarding means may comprise a pair of generally frustoconical profiled elements abutting each other with one side to define between the two elements an annular surface transverse of the longitudinal axes of the screws, the oppositely facing sides of the elements having configurations substantially matching the configurations of the adjacent screw portions. The outer diameter of the annular surface may correspond substantially to the apex diameter of the threads of the respective screw, and the inner diameter of said surface may correspond substantially to the base diameter of the screw threads. At least one of the elements may have on its side facing the other element a cylindrical extension having a diameter corresponding to the diameter of the respective side of the respective element.

One or several of the afore-described retarding means may be provided in each conveyor screw. Each of the retarding means may be composed of a threaded element, kneading disks or frustoconical elements. Several types of retarding elements as hereinbefore described may be combined in one retarding means, depending upon the specific properties of the material to be worked and the desired density or concentration of the material. Leakage between adjacent screws can be effectively impeded by an intersection of the annular surfaces formed between the two frustoconical elements of each retarding means combined with threaded elements having a pitch opposite to that of the conveyor screws. It is also possible to control the available range of the retarding pressure by combining several types of retarding components in a suitable fashion. A thorough cleaning of the peripheral groove in the drum wall can be achieved by combining threaded components with a pitch opposite to that of the extruder screws and frustoconical components disposed posteriorly of the threaded components.

The base of the peripheral groove in the drum may be conically enlarged in the discharge direction to obtain a smoother and more gradual increase in the compression of the material when the screws are axially displaced.

At least one degassing port may be provided in the drum posteriorly of a retarding means as seen in the direction of movement of the material through the extruder.

In the accompanying drawings several preferred embodiments of the invention are shown by way of illustration, and not by way of limitation.

In the drawing:

FIG. 7 is a fragmentary diagrammatic sectional view of a screw extruder including several retarding means according to the invention in one operational position thereof;

FIG. 8 is a sectional view similar to FIG. 7, but showing the retarding means in another operational position;

Figure 1:
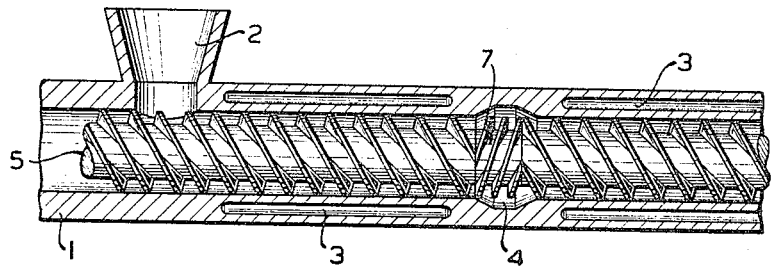
FIG. 1 is a diagrammatic fragmentary sectional view of a screw-type extruder including retarding means according to the invention, the retarding means being shown in one operational position.

Referring now to the figures in detail, the extruder, to the extent it is shown in FIGS. 1 through 6, comprises a drum 1 into which the material to be worked may be fed in pulverized, granulated or other suitable state by feed means indicated as a hopper 2. The hopper may be visualized as being located substantially at one end of the drum, the other end of the drum constituting the discharge end thereof. The drum may include channels 3 through which a heating medium or a coolant may be circulated in a conventional manner. The inner wall of the drum includes a peripheral groove 4 which constitutes part of the retarding means, as will be apparent from the subsequent description. Two parallel worms or screws (see FIG. 5) are rotatably supported in the drum in meshing relationship and lengthwise displaceable in reference to the drum. The screws are designated in FIGS. 1 and 2 by numeral 5, in FIG. 3 by numeral 6, and in FIGS. 4, 5 and 6 by numeral 9. Each of the screws may be visualized as being composed in a conventional manner of a plurality of screw elements slid upon a screw shaft (not shown) and secured against rotation in reference to the shaft. The screw shaft may be driven by a suitable and conventional power drive.

Figure 2:
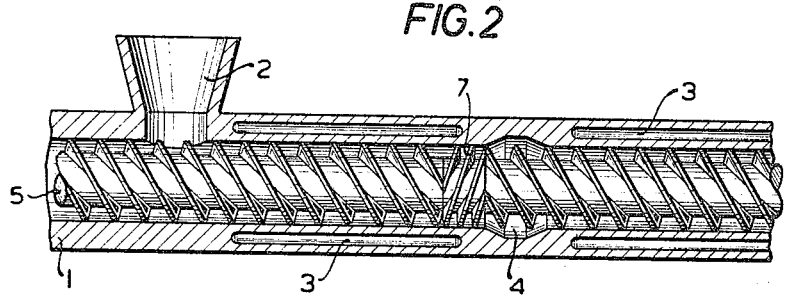
FIG. 2 is a sectional view similar to FIG. 1 but showing the retarding means in another operational position.

Reverting to FIGS. 1 and 2, the retarding means of each screw 5 as shown in these figures comprises a threaded retarding portion 7 the threads of which have a pitch direction opposite to that of screws 5. Such portion is interposed in each of the extruder screws. The screws including the retarding portions 7 are displaceable lengthwise in reference to the drum, and more specifically, in reference to groove 4. When the threaded portions 7 are placed in transverse registry with groove 4, as is shown in FIG. 1, material being conveyed through the extruder will experience practically no retardation, that is, practically no densification, when passing from the screw section left of each retarding portion 7 to the screw section on the right thereof. As is evident, the widening of the diameter of the inner drum wall within the zone coacting with each retarding portion 7 renders this portion substantially ineffective. However, when the retarding portions 7 are placed in the position of FIG. 2, that is, in a zone in which the inner diameter of the drum is not enlarged, the material is forced through the oppositely pitched threads of portions 7 so that it is correspondingly retarded and hence densified. Accordingly, the position of FIG. 1 constitutes the position of minimal densification, and the position of FIG. 2 the position of maximal densification. As is evident, any desired intermediate degree of densification can be obtained by selecting a position of the threaded portion intermediate the limit positions of FIGS. 1 and 2. Tests have shown that a gradual variation of the pressure build-up between 0 and about 3 can be readily obtained by a corresponding displacement of threaded portions 7. A further variation in the pressure build-up is obtainable by selecting a higher or lower pitch for the threads of threaded portions 7, or by changing the number of threads.

Figure 3:
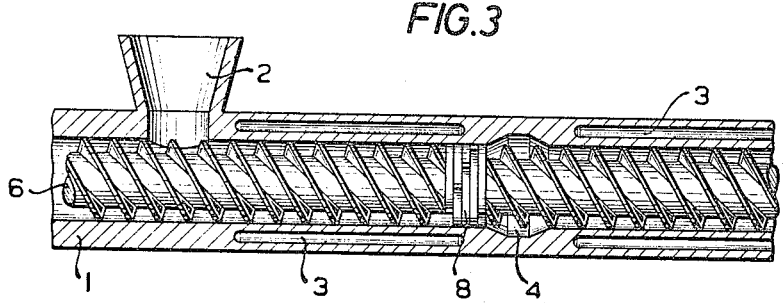
FIG. 3 is a diagrammatic sectional view similar to FIG. 2, showing a modification of the retarding means.

According to FIG. 3 the retarding portion comprises several rotary kneading disks 8 having a conveying direction opposite to that of screws 6. These kneading disks permit a very gradual change in the pressure build-up, to wit, from 0 to about 1. Further variations in the pressure build-up are possible by varying the number of the kneading disks, or the axial width thereof.

Figure 4:
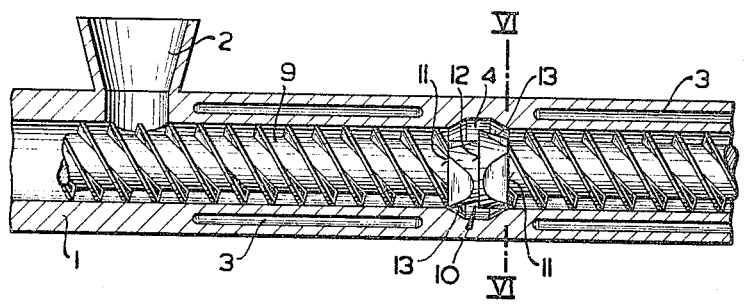
FIG. 4 is a sectional view similar to FIG. 1, showing a further modification of the retarding means.
Figure 5:
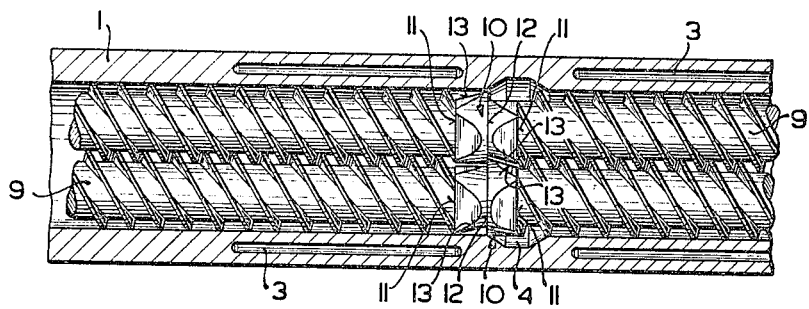
FIG. 5 is a plan view upon FIG. 4.
Figure 6:
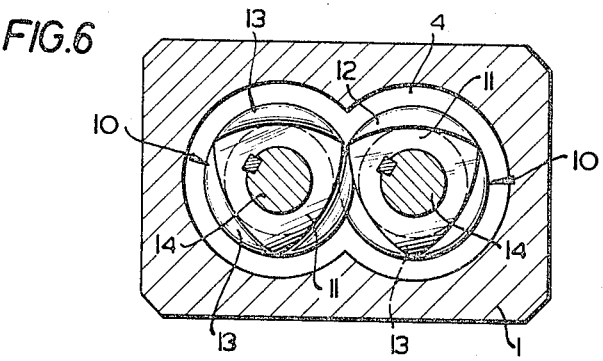
FIG. 6 is a section taken on line VI—VI of FIG. 4 on an enlarged scale.

According to FIGS. 4, 5 and 6, each of the two parallel extruder screws 9 includes a retarding means in the form of a member 10. Each of these members is composed of two elements of frustoconical configuration when axially cut (see FIGS. 4 and 5) and of approximately triangular configuration when transversely cut (see FIG. 6). The end walls 11 of these elements are disposed transversely of the axes of the extruder. The facing end walls of the two elements define an annular surface 12 which has a peripheral outline corresponding to the apex diameter and the base diameter, respectively, of screws 9 and is joined to the end walls 11 by generally conical wall surfaces 13. The two elements of each member 10 are mounted on a screw shaft 14 and displaced by an angle of 180° in reference to each other.

The elements of FIGS. 4, 5 and 6 permit a still finer graduation of the pressure build-up, than the heretofore described retarding means, to wit, between 0 and about 0.5. A further variation of this pressure range is obtainable by changing the axial width and/or other dimensions of the elements.

FIGS. 7 and 8 show an extruder drum 15 into which the material to be worked is fed through a hopper 16. Heating or cooling channels 17 are provided along the length of the drum. The extruder is provided with three retarding means comprising internal peripheral grooves 18, 19 and 20, respectively. The two parallel meshing screws 23 (see FIG. 5) rotating in the drum may be visualized as being composed of a plurality of screw elements keyed upon a power driven screw shaft.

Groove 18 coacts with a member 24 formed by two generally frustoconical elements similar to those described in connection with FIGS. 4, 5 and 6. The adjacent end walls of these two elements define therebetween an annular surface 29 and are extended by one or several cylindrical extensions 30. The surface 29 is joined to the oppositely facing end walls of the two elements by conical tapered walls 28 having diameters corresponding to the inner diameter and the outer diameter, respectively, of the elements.

The groove 19 coacts with two sets of rotary kneading disks 25 and 26 having conveying surfaces acting in opposition to the threads of screws 23.

Groove 20 coacts with a threaded portion 27. The threads in this portion are pitched in a direction opposite to that of the threads of screws 23.

Degassing ports 21 and 22 may be provided posteriorly of the second and third retarding means, respectively.

As is evident, the differently constructed retarding means provided in the extruder according to FIGS. 7 and 8 produce different pressure built-up or compression actions. Such differential compression or densification action is particularly useful when the material to be worked requires that it be subjected to several compressions or densifications, each at a higher rate, during its passage through the extruder. As is further evident, all three retarding means can be simultaneously adjusted by correspondingly displacing screws 23, for instance, from the position of FIG. 7 into the position of FIG. 8. The use of frustoconical elements in the retarding means first reached by the material to be worked is particularly suitable when the material initially has a very high viscosity or hardness caused, for instance, by the addition of fillers.

Figure 9:
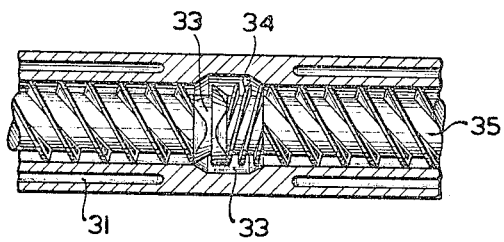
FIG. 9 is a fragmentary diagrammatic sectional view showing composite retarding means.

FIG. 9 shows a composite retarding means comprising two abutting frustoconical elements 33 of the kind described in detail in connection with FIGS. 4, 5 and 6 and a threaded retarding element 34 the threads of which have a pitch opposite to that of the threads of screws 35. A threaded retarding element has been described more in detail in connection with FIGS. 1 and 2. The retarding elements 33 and 34 coact with an internal peripheral groove 32 provided in drum 31. The retarding elements 33 are the anterior ones in the direction of movement of the material through the extruder. As is evident, the retarding elements 33 and 34 may be selectively displaced from the position of FIG. 9, in which they are in transverse registry with groove 32, into positions in which they are substantially out of registry with the groove. Depending upon whether the gap defined by the retarding components and the inner drum wall is more or less narrowed, the material conveyed through the extruder will be subjected to a correspondingly varied retardation and thus to a correspondingly varied densification. The threaded retarding element 34, being posterior of the retarding elements 33, constitutes in effect a seal impeding leakage of the material in the zone in which the annular surfaces formed between the two frustoconical elements intersect each other.

Figure 10:
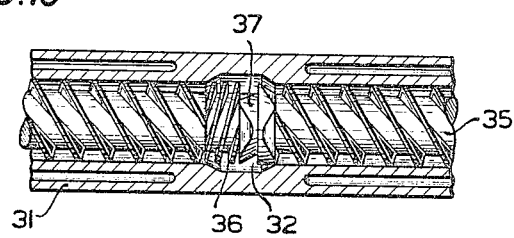
FIG. 10 shows a modification of the retarding means shown in FIG. 9.

The arrangement of FIG. 10 is similar to that of FIG. 9, except that a threaded retarding component 36 is disposed anteriorly of the retarding member 37 formed by the two frustoconical elements.

The arrangement of FIG. 10 has the particular advantage that the frustoconical elements effect a particularly efficient cleaning of groove 32 so that varying dwell times of particles of the material in the groove are avoided.

Figure 11:
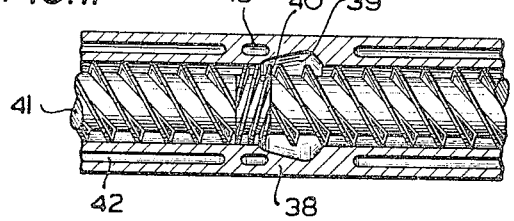
FIG. 11 is a diagrammatic fragmentary sectional view showing a modification of the peripheral groove in the extruder drum.

According to FIG. 11, the retarding means comprise an oppositely pitched threaded element 40 included in each of screws 41 rotatably supported in a drum 38 in parallel relationship. The drum wall includes heating ducts 42 and a cooling duct 43 disposed adjacent to peripheral groove 39, which coacts with threaded retarding elements 40 of the kind previously described.

While the grooves shown in the preceding figures are of symmetrical configuration, the groove 39 of FIG. 11 is conically enlarged in the direction of the movement of the material through the extruder. Such enlargement of the groove, in conjunction with oppositely pitched threaded retarding element 40, results in particularly smooth or gradual changes in the pressure build-up when the screws, and with them the threaded retarding element 40, are displaced in reference to the groove.

Figure 12:
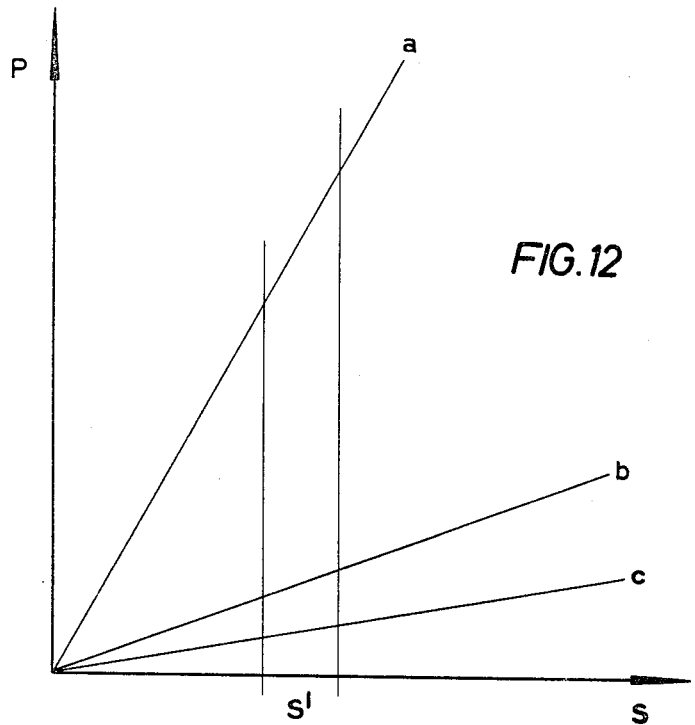
FIG. 12 is a graph showing the pressure or concentration build-up obtainable with retarding means according to the invention.

In the graph of FIG. 12 the ordinate P designates the compression or densification of the material in the retarding means, and the abscissa S indicates the distance of the axial displacement of the screws within the drum, or more specifically, of the retarding means included in the screws, in reference to the groove provided in the inner drum wall. The letter S' designates a selected part of such displacement; $a$ is a graph line for a threaded retarding element pitched in opposition to the threads of the screws; $b$ is a graph line for a set of kneading disks conveying the material in opposition to the screws; and $c$ is a graph line for a retarding means. A comparison of the different angles of the graph lines shows very clearly the differences in the pressure build-up obtained for the displacement S' by the afore-referred-to different arrangements of the retarding means.

The structural details of retarding means according to the invention may of course be changed in many ways within the scope of the inventive concept, and an extruder equipped with retarding means according to the invention may of course also be equipped with kneading and degassing zones, as they are conventional for extruders of the kind here involved. Finally, it should be understood that retarding means according to the invention may also be advantageously used for single screw extruders also.

While the invention has been described in detail with respect to certain now preferred examples and embodiments thereof, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A screw-type extruder for working material, said extruder comprising two screws in intermeshing parallel relationship, rotary conveyor for conveying the material through the extruder, each of said screws including intermediate the ends of the screw a retarding means having conveying elements with a smaller conveying rate than the screw threads adjacent said retarding means for retarding the material while passing said means, the conveying elements of one of said screws being in mesh with the conveying elements of the other screw, a drum rotatably and lengthwise displaceably supporting said screws, said drum having at one end a feed inlet and at the other end a discharge outlet and including in its inner wall a peripheral groove intermediate the ends of the drum to define an axially limited enlargement of the inner diameter of the drum, said screws being axially displaceable between a position in which the retarding means of the screws are in transverse registry with said groove and a position in which the retarding means are displaced in reference to said groove, thereby effecting a correspondingly varying clearance between said retarding means and the groove wall and thus a correspondingly varied retardation of the material while passing through said retarding means.

2. An extruder according to claim 1, wherein said retarding means comprises a threaded portion having threads the pitch of which is directed in opposition to that of the screw threads.

3. An extruder according to claim 1, wherein said retarding means comprises conveying elements in the form of rotary kneading disks, the conveying direction of said disks being opposite to that of said screw.

4. An extruder according to claim 1, wherein said retarding means comprises a pair of generally frustoconical profiled elements abutting each other with one side to define an annular surface transverse of the longitudinal axis of the screw, the oppositely facing sides of the elements having configurations substantially matching the configurations of the adjacent screw portions.

5. An extruder according to claim 4, wherein the outer diameter of said annular surface corresponds substantially to the apex diameter of the threads of the screw and the inner diameter corresponds substantially to the base diameter of said screw threads.

6. An extruder according to claim 5, wherein at least one of said elements has on its side facing the other element a cylindrical extension having a diameter corresponding to the diameter of the respective side of the respective element.

7. An extruder according to claim 4, wherein the retarding means included in adjacent screws are eccentrically staggered in reference to each other.

8. An extruder according to claim 1 and comprising at least a second retarding means included in each of said screws and disposed between the inlet and the outlet of said drum, one of said retarding means having threads directed in opposition to the threads of the screws and the other one of said retarding means including material-conveying rotary kneading disks having a conveying direction opposite to that of the screws.

9. An extruder according to claim 1 and comprising at least a second retarding means included in each of said screws and disposed between the inlet and the outlet of the drum, one of said retarding means having threads directed in opposition to those of the screws and the other including a pair of generally frustoconical profiled elements abutting each other with one side to define between the two elements an annular surface transverse of the longitudinal axis of the screws, the oppositely facing sides of the elements having configurations substantially matching the configurations of the adjacent screw portions.

10. An extruder according to claim 1, wherein said retarding means comprises a set of rotary kneading disks including disks having oppositely facing conveying surfaces.

11. An extruder according to claim 1, wherein said retarding means comprises a set of rotary kneading disks including oppositely facing conveying surfaces and a pair of generally frustoconical profiled elements abutting each other with one side to define between the two elements an annular surface transverse of the longitudinal axis of the screw, the oppositely facing sides of the elements having configurations substantially matching the configurations of the adjacent screw portions.

12. An extruder according to claim 1, wherein the base of said peripheral groove is generally outwardly tapered in the conveying direction of the screw.

13. An extruder according to claim 1, wherein said drum includes in its peripheral wall at least one vent port disposed between said retarding means and said outlet of the drum.

References Cited

UNITED STATES PATENTS

| | | | |
|---|---|---|---|
| 2,595,455 | 5/1952 | Heston | 18—12 |
| 2,615,199 | 10/1952 | Fuller | 18—12 |
| 2,838,794 | 6/1958 | Munger et al. | 18—12 |
| 2,970,341 | 2/1961 | Mallory et al. | |
| 3,078,512 | 2/1963 | De Haven | 18—12 |
| 3,192,564 | 7/1965 | Beck et al. | 18—12 |
| 3,287,477 | 11/1966 | Visilind | 18—12 X |

FOREIGN PATENTS

| | | |
|---|---|---|
| 942,260 | 11/1963 | Great Britain. |
| 1,365,788 | 5/1964 | France. |
| 981,960 | 2/1965 | Great Britain. |

WILLIAM J. STEPHENSON, *Primary Examiner.*